United States Patent
Kogon

(10) Patent No.: US 10,315,130 B2
(45) Date of Patent: Jun. 11, 2019

(54) PHYTOCHEMICAL EXTRACTION SYSTEMS, METHODS, AND DEVICES

(71) Applicant: Boris David Kogon, Seattle, WA (US)

(72) Inventor: Boris David Kogon, Seattle, WA (US)

(*) Notice: Subject to any disclaimer, the term of this patent is extended or adjusted under 35 U.S.C. 154(b) by 203 days.

(21) Appl. No.: 15/339,816

(22) Filed: Oct. 31, 2016

(65) Prior Publication Data

US 2018/0008906 A1 Jan. 11, 2018

Related U.S. Application Data

(60) Provisional application No. 62/360,737, filed on Jul. 11, 2016, provisional application No. 62/373,284, filed on Aug. 10, 2016, provisional application No. 62/373,275, filed on Aug. 10, 2016.

(51) Int. Cl.

| | | |
|---|---|---|
| *B01D 11/02* | (2006.01) | |
| *B01D 11/00* | (2006.01) | |
| *A61L 9/00* | (2006.01) | |
| *B01D 39/10* | (2006.01) | |
| *F25B 19/00* | (2006.01) | |

(52) U.S. Cl.
CPC ...... *B01D 11/0219* (2013.01); *B01D 11/0288* (2013.01); *B01D 11/0292* (2013.01); *B01D 39/10* (2013.01); *F25B 19/005* (2013.01); *B01D 2011/007* (2013.01)

(58) Field of Classification Search
CPC ............ B01D 11/0296; B01D 11/0288; C07D 311/80; F25B 19/005
USPC ........ 196/14.52; 202/169; 422/38, 261, 267, 422/285, 292, 307; 426/417, 486
See application file for complete search history.

(56) References Cited

U.S. PATENT DOCUMENTS 9,669,328 B2 * 6/2017 Jones ........................ C11B 1/10

* cited by examiner

*Primary Examiner* — Monzer R Chorbaji
(74) *Attorney, Agent, or Firm* — Benedict R. Dugan; Lowe Graham Jones PLLC

(57) ABSTRACT

This disclosure describes systems, methods, and devices for phytochemical extraction. One example extraction system includes two solvent columns, a material column, and a dewaxing column. The solvent columns store and provide solvent for stripping target chemicals from plant material in the material column. The solvent mixed with target chemicals passes into the dewaxing column, where the target chemicals are separated from waxes and lipids. Cooling is applied to elements of the system by way of an open-loop $CO_2$ refrigeration method. Solvent is moved from the solvent columns to the material column by creating a pressure differential between the two solvent columns.

20 Claims, 19 Drawing Sheets

PHYTOCHEMICAL EXTRACTION SYSTEMS, METHODS, AND DEVICES

CROSS-REFERENCE TO RELATED APPLICATIONS

This application claims the benefit of priority from U.S. Provisional Patent Application No. 62/360,737, entitled "SOLVENT DEPRESSURIZATION DEVICES, SYSTEM, AND METHODS," filed on Jul. 11, 2016; U.S. Provisional Patent Application No. 62/373,284, entitled "EXTRACTION COLUMN FOR A PHYTOCHEMICAL EXTRACTION SYSTEM," filed on Aug. 10, 2016; and U.S. Provisional Patent Application No. 62/373,275, entitled "CLEAR LID WITH RETAINER CLAMPS FOR A COLLECTION VESSEL IN A PHYTOCHEMICAL EXTRACTION SYSTEM," filed on Aug. 10, 2016, all of which applications are incorporated herein by reference in their entireties.

TECHNICAL FIELD

The present disclosure relates to phytochemical extraction systems, methods, and devices.

DETAILED DESCRIPTION

Figure 1:
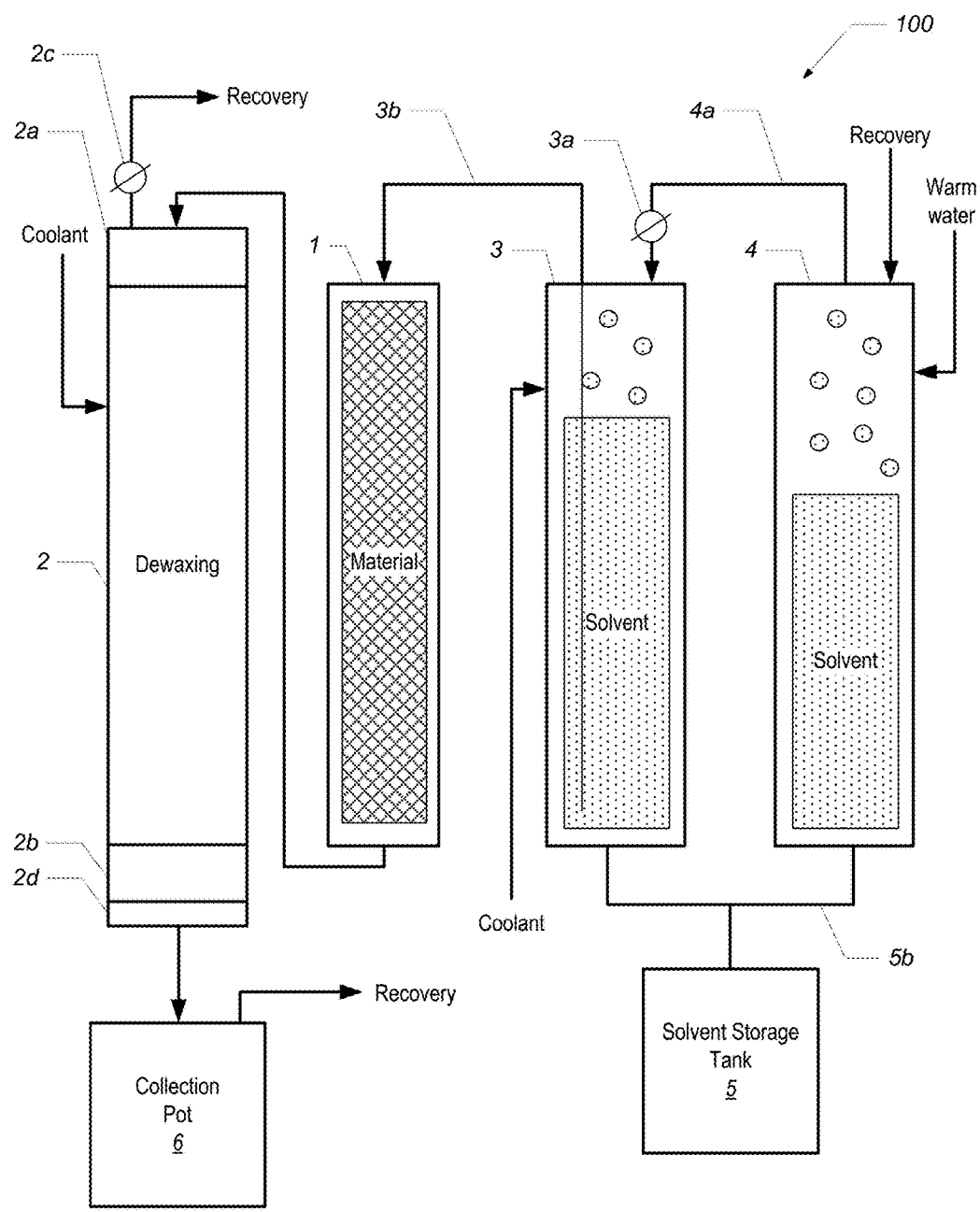
FIG. 1 is a block diagram of a phytochemical extraction system according to one embodiment.

FIG. 1 is a block diagram of a phytochemical extraction system 100 according to one embodiment. The system 100 includes a material column 1, a dewaxing column 2, a first solvent column 3, and a second solvent column 4. Each of the columns is a jacketed column such as those shown and described in U.S. Provisional Patent Application No. 62/373,284, entitled "EXTRACTION COLUMN FOR A PHYTOCHEMICAL EXTRACTION SYSTEM," filed on Aug. 10, 2016.

In overview of the system 100 and its operation, the material column 1 is filled with material, such as the plant matter from which phytochemicals are to be extracted. Each of the solvent columns 3 and 4 hold a volume of liquid solvent. By forcing warm water or other heated liquid into the jacket of column 4, the liquid solvent boils, which creates head pressure in column 4. The head pressure is relieved into the head of column 3 via conduit 4a, which forces solvent from column 3 up through the dip tube 3b, and into the material column 1. The solvent washes the material in the material column 1, and the extract (in solution with the solvent) is forced into the dewaxing column 2, where the target phytochemicals are separated from waxes and lipids that were also stripped from the material during the solvent wash in the material column 1.

Elements and aspects of this extraction system and process are described in additional detail below.

CO2 Open-Loop Refrigeration

This disclosure introduces the concept of liquid carbon dioxide open-loop refrigeration. $CO_2$ has long been used as a powerful refrigerant, known as R-744. While $CO_2$ refrigeration in itself is not new, the application and adaptation for its use in the described jacketed columns is novel, and advantageous over previous cooling methods.

The described technique has several advantageous features. First, $CO_2$ is non-toxic, so it may be safely vented into the atmosphere. This allows the described process to skip the compression side of the standard refrigeration cycle. This saves us the significant cost of a condenser core and compressor. Instead, the atmosphere is treated as a thermodynamic heat reservoir, and releases the expanding $CO_2$ gas as exhaust. We thus refer to this technique as "open-loop refrigeration" as opposed to a traditional closed-circuit system which recycles its refrigerant.

Jacketed columns and vessels are usually used with a heat-exchange fluid, such as ethanol, glycol, or aqueous salt solution. A recirculating chiller is often used to cool and pump this heat-exchange fluid through the jackets to cool the vessels. Such chillers are expensive refrigeration systems, comprised of both a traditional evaporator and condenser cores, with a compressor to electrically drive the refrigerant in a closed-loop. Additionally, such chillers are often incapable of removing a significant amount of heat at low temperatures, without requiring a considerable expense for multiple stages of compressor and refrigerant. Even when price is not the prohibiting factor for such an instrument, their energetic requirement of 3-phase power, and their electrical consumption, can be an impediment to their use.

The jacket of a vessel itself can be treated as a refrigeration evaporator core. This "removes the middleman" of cooling a circulating heat-exchange fluid, significantly reducing the cost and complexity of the cooling operation.

The described technique relies on the fact that $CO_2$ is cheap and readily available from industrial gas suppliers worldwide. At $0.30 per pound, it is cheaper to release it as an expendable cooling agent than to pay for the cost of recompressing and condensing it. $CO_2$ is ideal for the described purposes because it has a relatively high Enthalpy of Evaporation (at 574 kJ/kg, compared to 199 kJ/kg for the much lower boiling N2). Furthermore, the triple-point of $CO_2$ is at 5.11 atm, far above Standard Pressure.

By leaving the evaporator-core (column jacket) open at its exhaust port, the liquid $CO_2$ is exposed to 1 atmosphere of pressure, causing part of its mass to boil rapidly to vapor while the remaining mass is forced to freeze into dry ice snow, which settles and accumulates inside the jacket. Dry ice has a temperature fixed by its sublimation phase-change at roughly $-109.2°$ F., or $-78.5°$ C., which it turns out is a very beneficial set-point for the purposes of cooling and condensing hydrocarbon solvents butane and propane. Furthermore, the Enthalpy of Sublimation of the solid form of dry ice is approximately 58% greater than as a boiling liquid. This makes the dry ice residue that fills the jacket very efficient at holding a low temperature near its sublimation "set-point" inside the column it surrounds.

The described process, in typical embodiments, uses a cryogenic dewar of refrigerated liquid $CO_2$, 200 L, and 350 psi. Larger dewars are available as permanently installed "micro-bulk" tanks. $CO_2$ pressure must be kept about 200 psi to maintain adequate feed pressure. If the internal pressure is too low, caused by the liquid inside being too cold, a Pressure-Building Valve can be opened to warm and pressurized the head space. Cylinders of compressed $CO_2$, with a dip-tube for liquid withdrawal, can be used instead, but they are not recommended as internal pressures at room temperature can exceed 750 psi and may be dangerous.

Figure 3A:
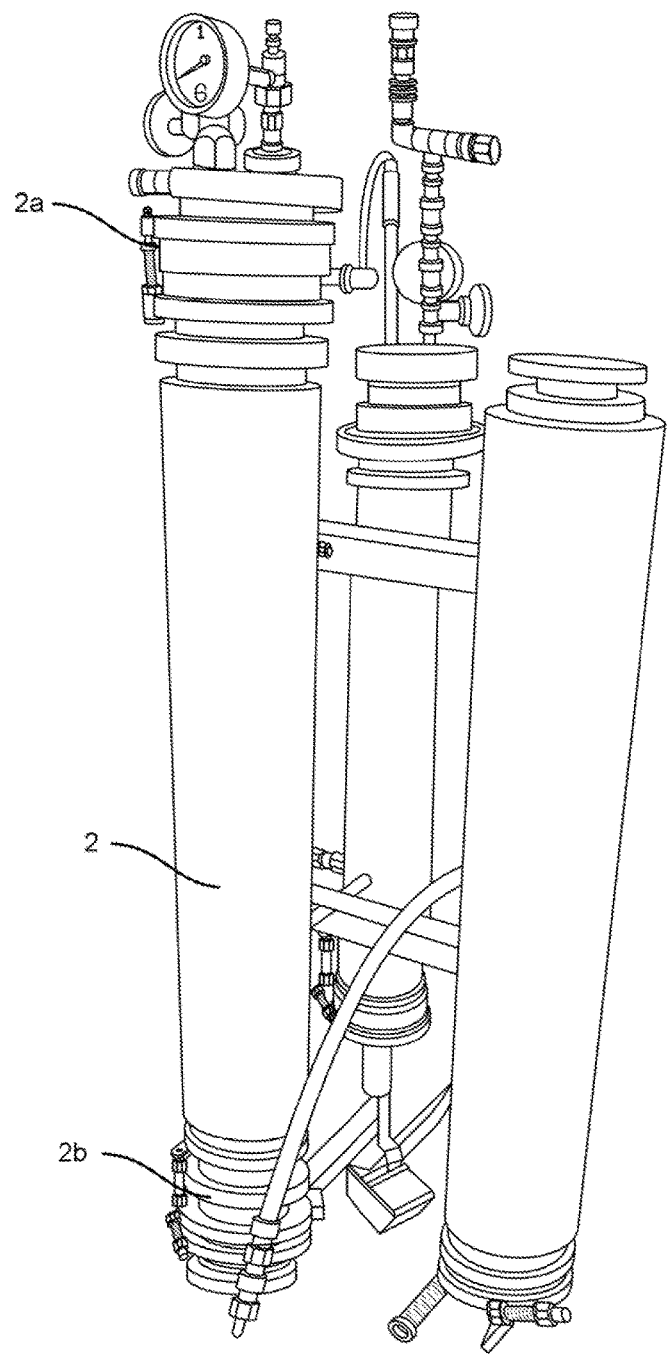
FIGS. 3A-3G show elements of a phytochemical extraction system according one embodiment.
Figure 3B:
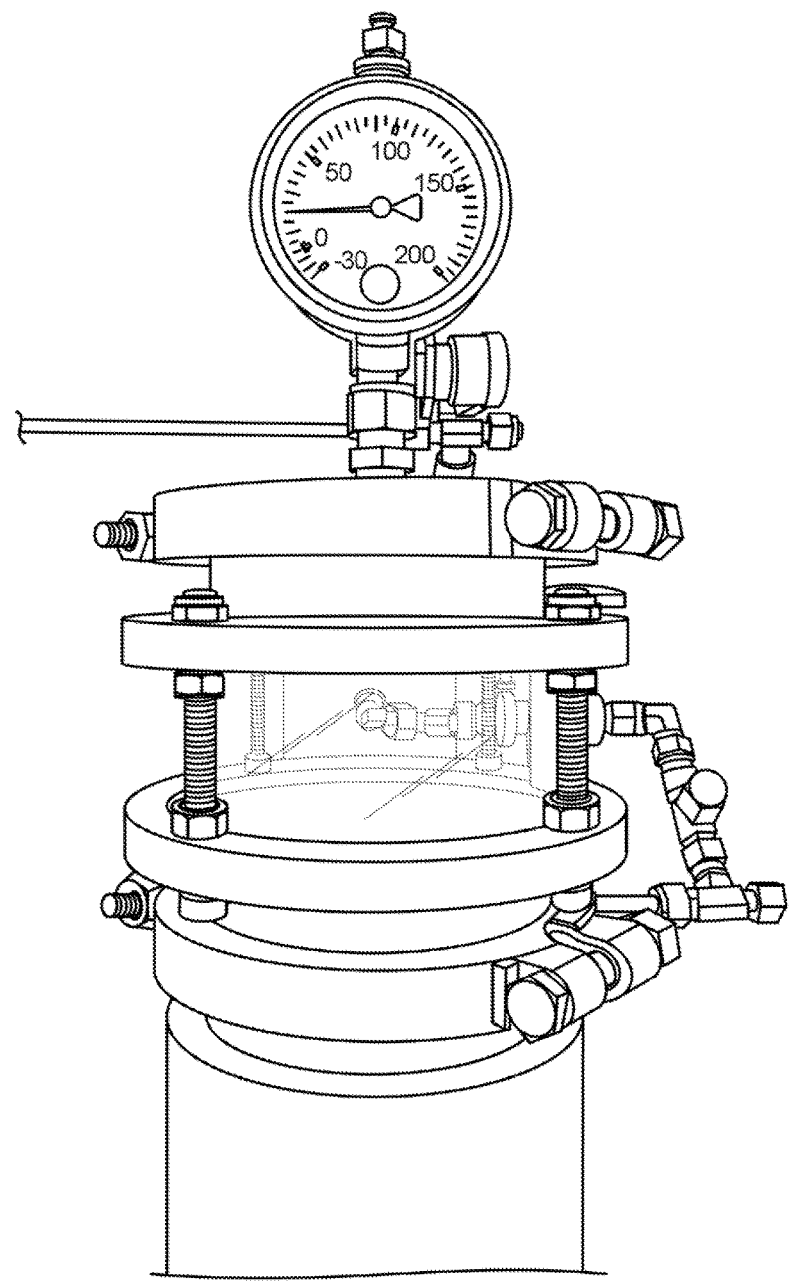
Figure 3C:
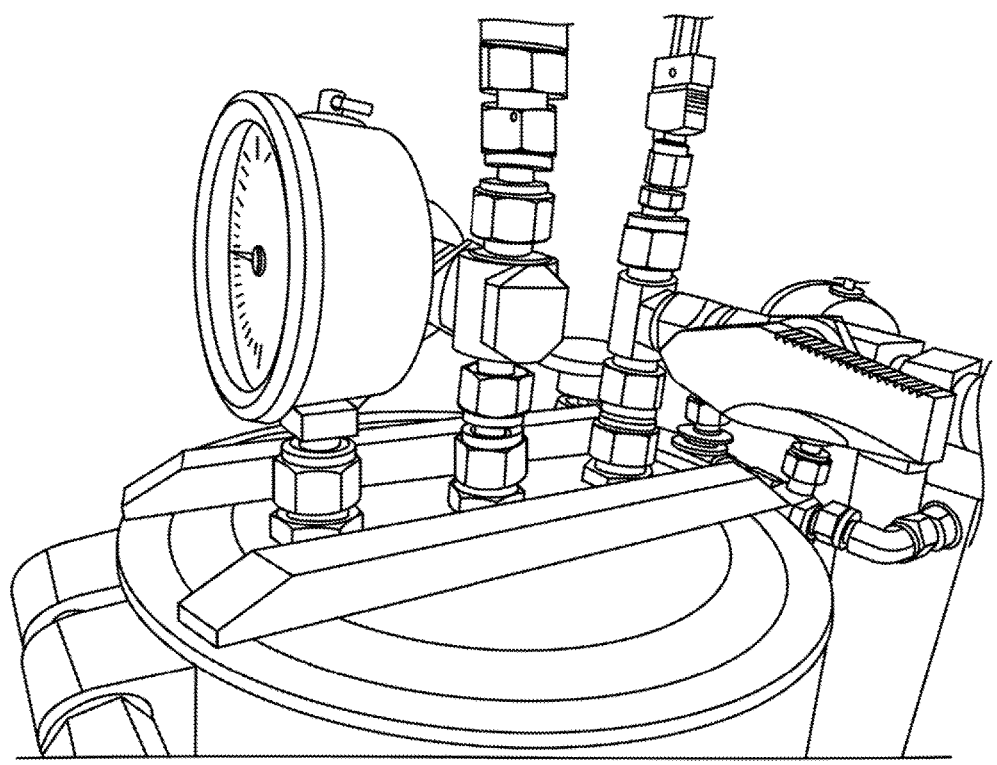
Figure 3D:
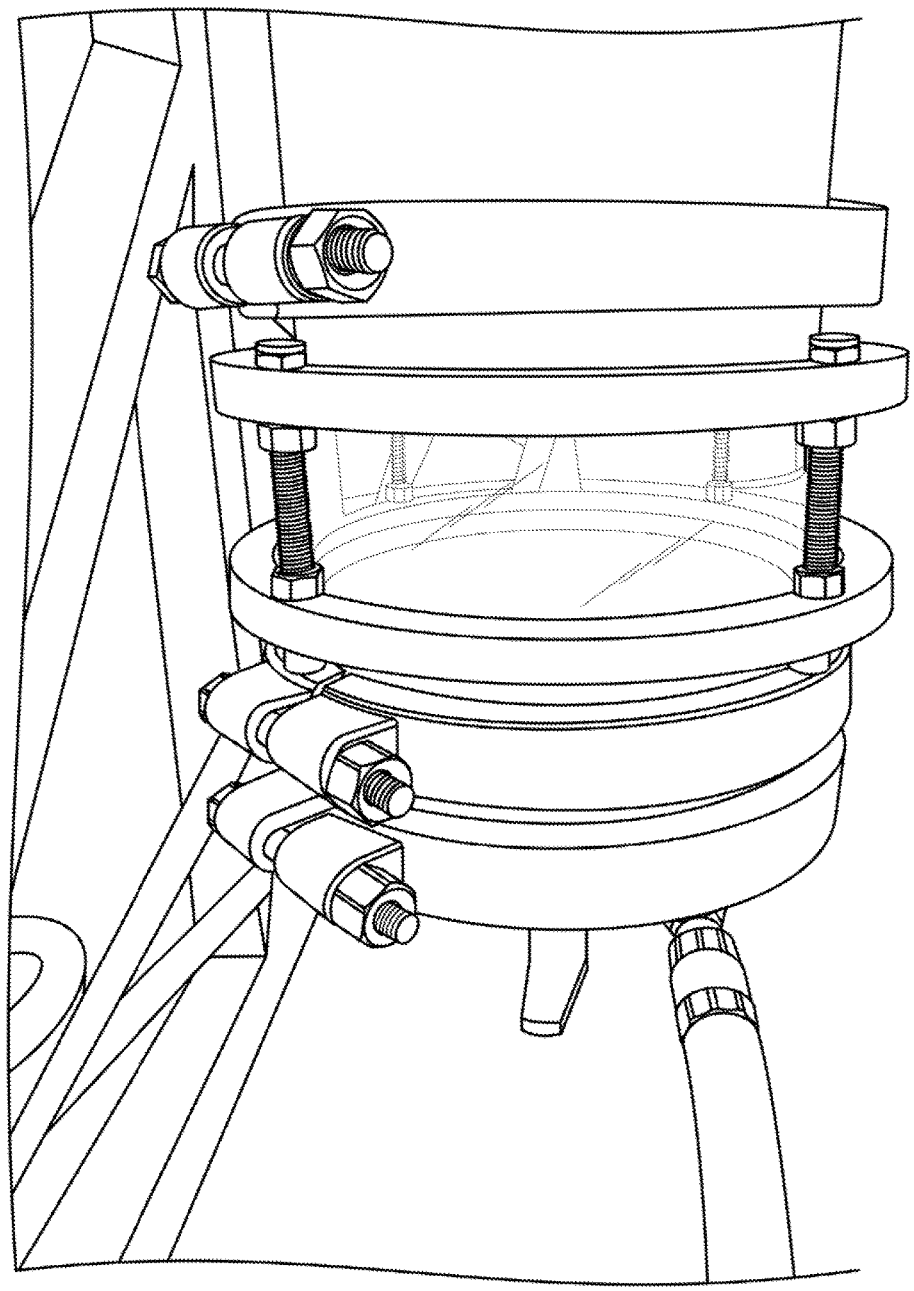

The process involves slowly releasing a steady amount of liquid $CO_2$ into the cooling jacket of a column, controlled by a regulating needle valve. The liquid is allowed to expand under atmospheric pressure, thus undergoing phase changes both to vapor and to solid form. The $CO_2$ may be injected either from bottom to top, or top to bottom, the described jacketed columns have ports near the top and the bottom of the jacket. In the latter configuration, the process will slowly fill the jacket completely, at which point the backpressure will cause the flow to stop. Each column is outfitted with a "$CO_2$ controller" comprising a regulating needle valve and a pressure relief valve ("PRV"). We have tested PRVs from 10-100 psi and we prefer values from 80-100 psi as this is above the triple-point and allows the $CO_2$ to remain liquid in an over-pressure event. A $CO_2$ control assembly with a PRV is shown in FIG. 3G.

The process further includes turning the needle valve from the $CO_2$ supply off when either 1) the PRV releases, or 2) the exhaust flow of $CO_2$ vapor stops, with or without PRV release. Note that $CO_2$ may form dry ice in the PRV and prevent it from releasing. Thus, a blockage of exhaust vapor is sufficient to indicate the jacket is full and supply should be turned off to prevent the jacket pressure from equalizing with the internal supply pressure of the dewar. Column jackets are engineered to sustain a higher pressure than the vent valve on the supply dewar (350 psi), thus building a safety margin into the system. In some embodiments, a human monitors the operation to determine when to shut the needle valve. In other embodiments, needle valve regulation is performed by an automatic pressure-governing system that regulates $CO_2$ supply and operation.

Alternatively, a PRV>80 psi may be installed at the top of a column as a back-pressure regulating exhaust valve, and liquid $CO_2$ may be fed into the bottom port of the column. So long as the vapor pressure in the column exceeds the triple-point pressure of $CO_2$ (approximately 75 psi) it is able to remain a liquid, and it will fill the jacket and slowly boil away. In this modality, the simmering liquid $CO_2$ has a boiling point (i.e., set-point temperature) that is a function of the back-pressure regulator. Use of an adjustable back-pressure regulator will allow the user a crude, but very simple mechanism to control this boiling temperature "set-point".

Secondary Dewaxing Column

Figure 2:
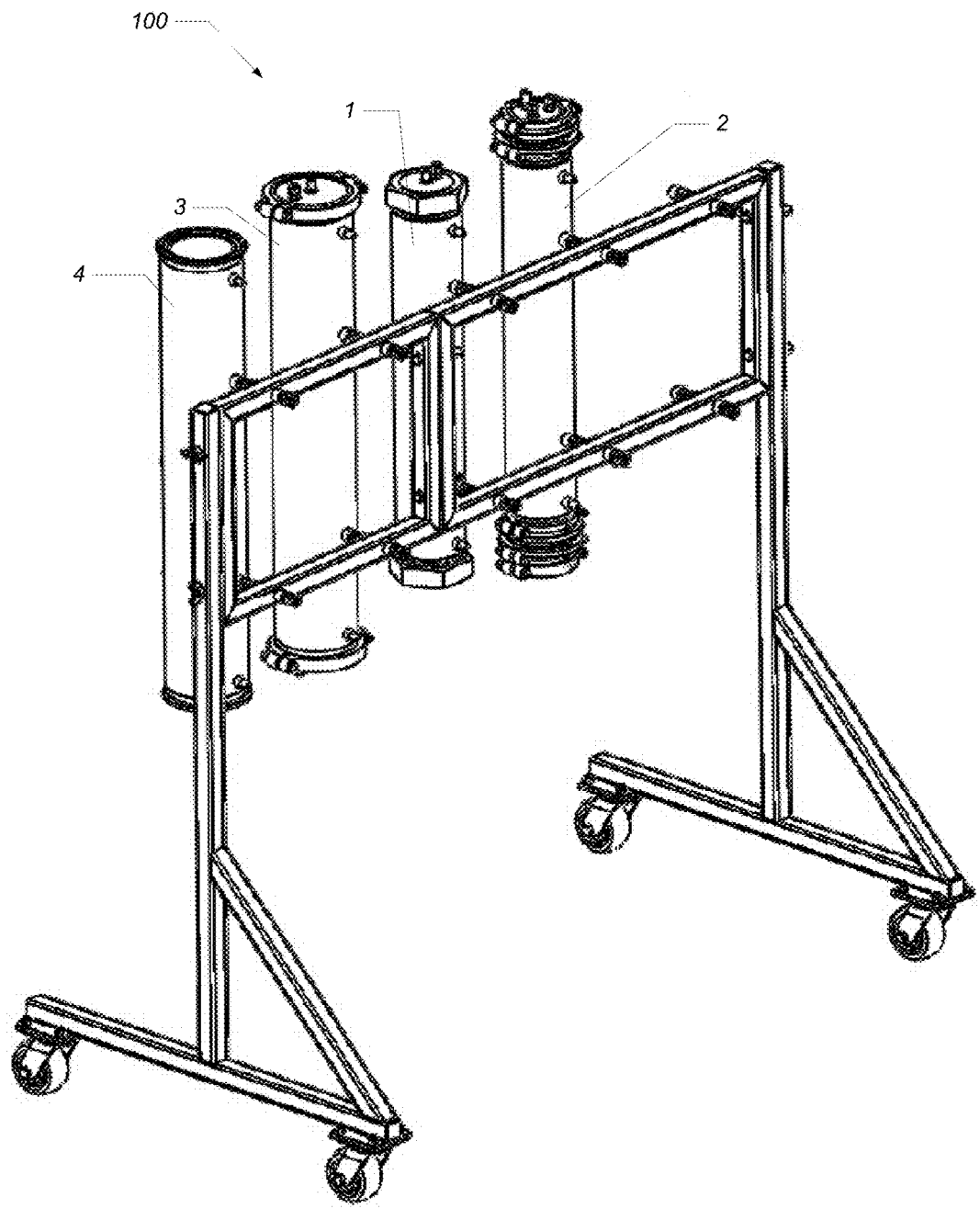
FIG. 2 is a perspective view showing some components of a phytochemical extraction system according to one embodiment.

This disclosure also introduces a component referred to as a "secondary dewaxing column", and a corresponding technique called "secondary stage, single-solvent dewaxing." The described column and corresponding process filters and separates by means of differential solubility. FIGS. 1 and 2 show a secondary dewaxing column 2 according to one embodiment. FIG. 3A shows a secondary dewaxing column 2.

Many plants that are processed by the described techniques have inert compounds, such as waxes and lipids, that are soluble along with the phytochemicals that we are pursuing. A goal is to separate these lipids out from initial solution by means of differential solubility and precipitation. It is a property of physics that the amount of solute a solvent can hold is proportional to temperature. Different solutes will have affinity for a given solvent based on their differing chemistry. When a solute becomes super-saturated in a solution, either by reducing the solution's temperature, or by condensing the solution through evaporation, there is a tendency for the solute to precipitate out of solution into a solid form. This precipitate will often settle out or remain suspended in the liquid, where it can be either decanted of or filtered from the remaining solution. The described techniques take advantage of the fact that the phytochemical compounds of interest remain soluble at lower temperatures than the waxes we are trying to separate.

Previous to my invention, dewaxing was accomplished by storing flasks or beakers of often flammable and volatile solutions in a cold freezer, giving the waxes time to precipitate and separate, before filtering through a vacuum-assisted Büchner funnel. This poses problems for the technician as the volatile solvent can ignite in the freezer's electronics, and its volatility increases as it is exposed to the air and warms.

Also previous to my invention, some vertically oriented designs used dry ice to cool a secondary vessel, below the material column. This is disadvantageous, as it limits the size of the material column and the dewaxing vessel beneath it to what is practical under an ordinary ceiling height. Additionally, dry ice has a fixed "set-point" of −109.2° F. which may be too cold for some intended applications.

My observation is that the same type of column used to hold the material for the primary extraction can also be used to hold solution in a secondary stage. Placing these columns side-by-side on a horizontal rack (see FIG. 2) provides a more flexible form-factor than stacking them vertically. Additionally, the above-described $CO_2$ refrigeration process is used to cool this secondary stage. By throttling refrigerant on and off, the cooling effect can be modulated, thereby controlling the temperature of the solution inside the column with greater effect than cooling with dry ice.

The process, described with reference to labeled components shown in FIG. 1, starts with two columns positioned next to each other: column 1 (FIG. 1) is called the "material column" ("matCol") and is filled with the material we intend to extract from; column 2 is called the "dewaxing column" (dewaxer) and is initially empty. Both columns are fitted with a filter medium at the bottom. The top of the matCol 1 is plumbed to the solvent supply tank 3, while the bottom is plumbed to the top of the dewaxer 2. Shut-off valves are fitted at the end of both columns to control fluid movement. By this means, solvent may be fed down through the top of the material column 1, filling it completely until it is forced out the bottom and back into the top of the dewaxer 2, filling the dewaxer completely.

As shown in FIGS. 1 and 3A, the dewaxer is fitted with a large viewing sight-glass at both its top (2a) and bottom (2b). FIGS. 3B and 3C also show views of a top sight glass. FIG. 3D shows a view of a bottom sight glass. The sight-glass 2a at the top allows the operator to see when solution had filled the material column and begins filling the dewaxer. The sight glass 2a also allows the operator to more precisely control the rate of flow, and insures that the operator can fill the dewaxer 2 completely without over-filling. The sight-glass 2b at the bottom allows the operator to see when the dewaxing precipitation reaction is finished, and determine when to drain the dewaxer 2. These are both important to our efficient operation, and the sight glasses must be able to tolerate the extremes of both pressure and temperature.

Once the dewaxer 2 is filled with solution, the valve connecting it to the material column is closed and the vessel is cooled. This can be accomplished in two ways:

1. First, the top of the dewaxer 2 is fitted with a recovery port 2c from which solvent vapor may be drawn from the vessel into another recovery vessel. This may be accomplished by use of either a pump, or by thermodynamic condensation at the other end. Releasing vapor from the head space will lower its pressure and cause the solution inside the vessel to boil, causing it to cool evaporatively, and also condensing the liquid volume of the solution.
2. After the solution has optionally been condensed and evaporatively pre-cooled, we turn on the CO2 refrigeration in the dewaxer jacket, further cooling it to the desired set-point. In the case of butane solvent, the desired temperature to precipitate plant waxes is around −40 degrees. This temperature is higher for solvent mixes containing isobutene and propane.

Once the target temperature is reached, the vessel is held there for approximately 30-60 minutes. The operator will observe a reaction where the solution first turns from clear to cloudy. This is the beginning of precipitation. Gradually the precipitates will gather into larger particles and settle out of solution. It is helpful to pack the dewax column with some sort 3-dimensional coarse filtration medium, to capture and hold these particles while keeping them suspended about the finer 2-dimensional filters at the bottom.

After 30-60 minutes, the operator will observe that the cloudy solution has coagulated and separated and becomes qualitatively clear again. At this point the solution is drained through the fine filters 2d (5-40 microns; positioned below the lower sight glass 2b of the dewaxer 2) into a collection pot 2e where the solvent can be separated from the desired phytochemical solute by means of distillation and recovery. To accomplish this it is necessary to induce a pressure of 50-100 psi in the headspace of the dewaxer 2, by means of an inert gas such as regulated nitrogen, or by introducing heated vapor of the primary solvent itself. The material column, still filled with solvent-soaked extracted media, can be heated through its jacket in order to provide the heated solvent vapor pressure. This technique is thus referred to as "pressure-assist" or "warm-vapor pressure-assist".

Note that the described dewaxing process is in some ways similar to the vacuum-assisted Büchner funnel filtration technique, with the important difference that the closed-loop system does not have to be opened up to move the solution, and the volatile solvent does not have to be exposed to air or the environment, where it could be ignited. Thus, the described dewaxing column is sometimes referred to as a "closed-loop Büchner funnel".

Note that filtration can be a difficult step in this process. If the filters are too coarse, waxes will pass through them under pressure, and if they are too fine then they will clog frequently, increasing the time it takes to drain, and lengthening run-times. Column packing material, or 3-dimensional filtration medium, is on approach to the problem.

Figure 4A:
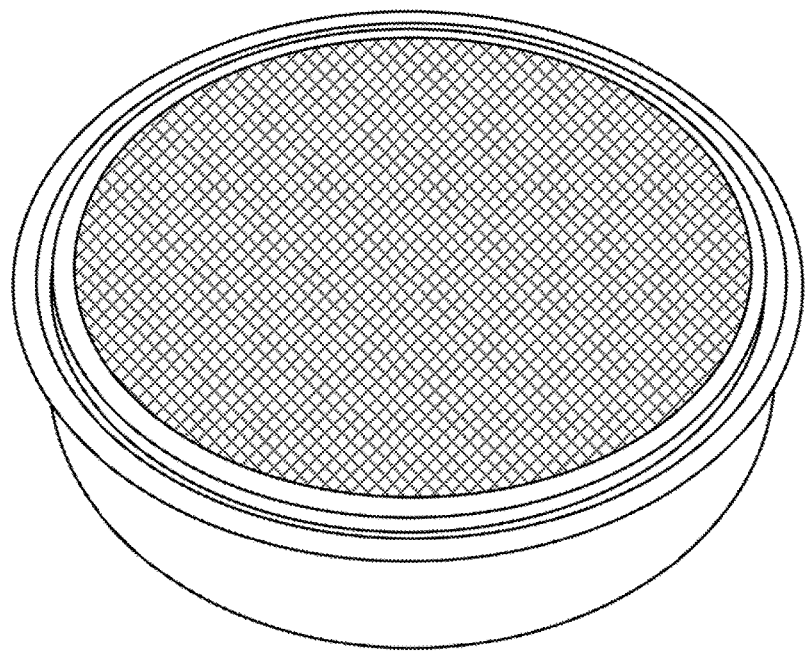
FIGS. 4A-4C show views of a filter spool according to one embodiment.
Figure 4B:
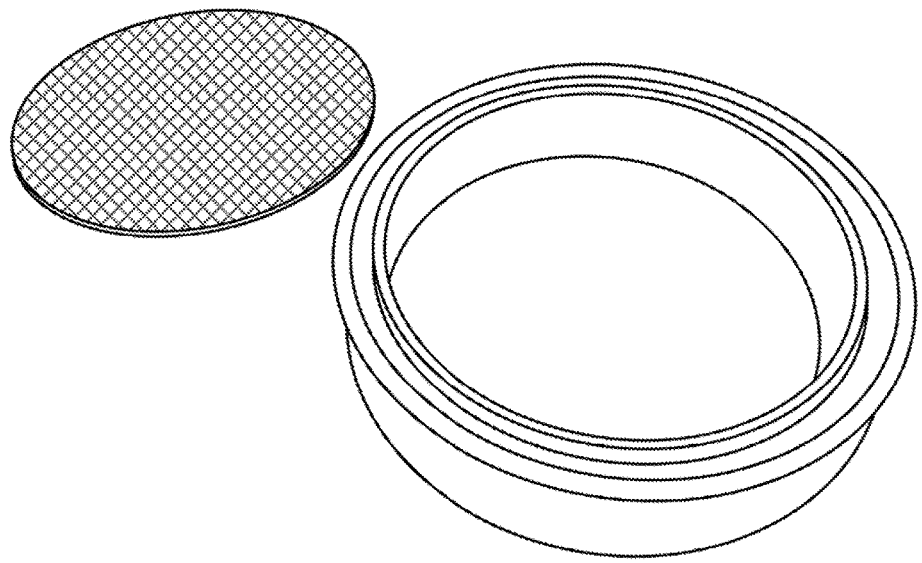
Figure 4C:
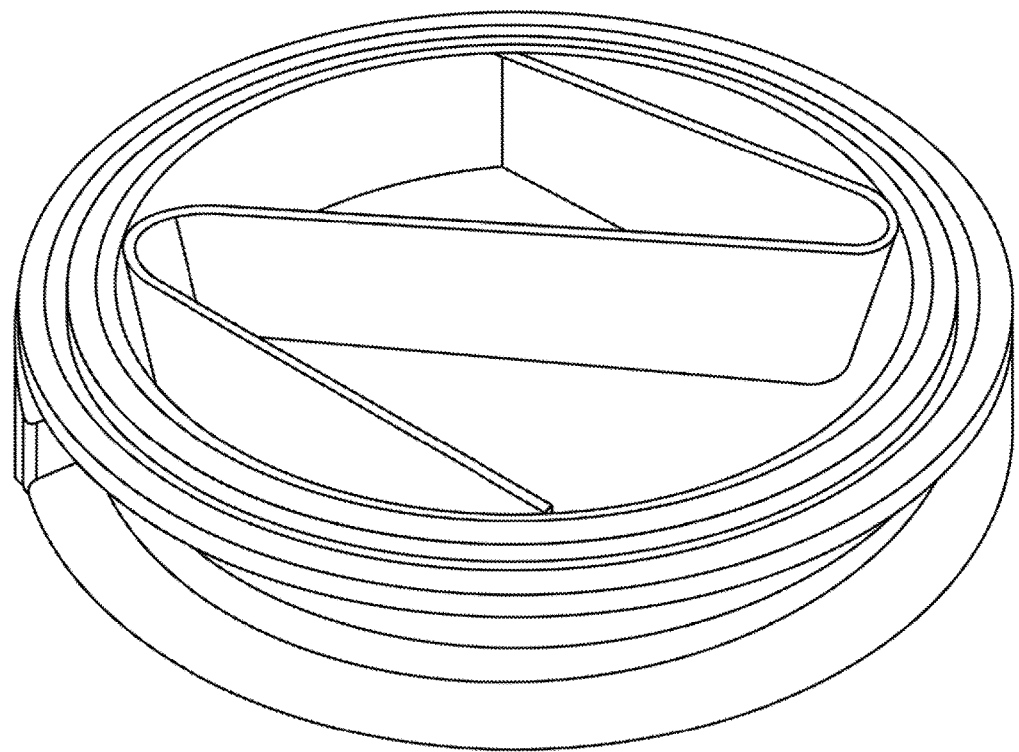

To improve filtration, a novel device called a "filter spool" is provided. FIGS. 4A-4C show a filter spool according to one embodiment. A filter spool is a small section of tubing, using a standard clamp ferrule at each end, which has been machined to accept a thin rigid disc made of electrically welded, or sintered, mesh of precise porosity. These discs are clamped between the gaskets and the ferrules of the filter spool, making a fluid-tight seal. Much care has been taken to study the porosity of these filter discs, and the pressure drop between them. Empirical results have shown that no more than two filter discs should be used in series before the pressure drop across them affects our ability to push liquid through the column. Consequently, if more filters are needed, it is recommended that head pressure be renewed in a sequence of filtration columns, with no more than two filter discs in each. For practical purposes, a progressive filter stack of 20 micron and 10 micron provides excellent performance.

In addition to the filtration techniques above, an alternative decanting-style technique is described. Precipitated waxes tend to be heavier than solution and settle to the bottom, where they form a layer on the filters and thereby restrict flow through them. The above-described approach includes the addition of a 3-dimensional column packing medium to capture and trap precipitation particles. Alternatively, it is possible to remove the fine 2-dimensional filters from the bottom of the dewaxing vessel, and place them in a small module below the main dewaxer, separated by a shut-off valve. The bottom of the dewaxer is fitted with a small section of tubing that protrudes up into it, through the cap at its bottom. This short section of tubing will drain the entire column-volume of liquid above it, but none below, just as a siphon-tube inserted to the same depth would decant it from above. By allowing the precipitates to settle to the bottom of the dewaxer, without filtration below it, rather than capturing in the column packing, it accomplishes many of the same goals:

1. The short tubing drains all of the solution above it, through the shut-off valve and the filter discs below the dewaxer, while leaving the sediment at the bottom undisturbed.
2. The majority of the precipitate stays in the bottom of the dewaxer, and does not touch the fine 2-dimensional filters or contribute to clogging them.
3. The sediment can be easily flushed from the dewaxer through a second shut-off valve directly through the bottom of the cap. This greatly eases cleaning the dewaxer, and there is no longer need for the column packing.

Note that these two dewaxing techniques can be used in series to get better results through two-stage dewaxing: 1) first removing the bulk of precipitation through a decanting-filtration dewaxer; and 2) followed by a second cooling and precipitation in a Büchner-funnel style filtration.

Solvent/Recovery Columns

The described systems and methods include a novel way to supply, pre-cool, and recover solvent by means of storing the solvent in columns instead of tanks. Traditionally, a larger tank is used for supply, and it is commonly chilled down to operating temperatures with dry ice.

A long thin column, or a short fat disc, has a much more efficient heat exchange property than a tank, because both have a higher surface area to volume ratio. Heat exchange is accomplished through the skin of the vessel, so higher surface area is advantageous. A sphere has the lowest surface area to volume possible, and approximates the shape of a stocky tank. Of the column and disc shapes, the column is much more practical from a fabrication and usage perspective.

By combining the CO2 jacket refrigeration method described above, and by using several cooled, jacketed column to hold solvent, it is possible to efficiently and quickly cool solvent down to operating temperatures, without the difficulty of working with dry ice. In practice, one implementation has been tested to cool 15 pounds of butane solvent from 70 F to −80 F in 10 minutes using CO2 refrigeration. This is far faster than using dry ice on an equivalent tank.

One issue that must be overcome is the fact that hydrocarbon solvents like butane and propane have very low vapor pressures at such cold temperatures. For example: n-butane at −80 F has a vapor pressure around 28 inHg, nearly a compete vacuum. This makes it difficult to move the solvent out of a tank or column without the aid of some kind of pump. To resolve this, a method called "pressure-assist" is used to pressurize the headspace of the cold solvent column, and force the cold liquid out a column dip-tube.

With reference to FIG. 1, two solvent columns 3 and 4 are arranged side-by-side on a horizontal rack. The first column 3 is cooled with CO2 refrigeration, while the second column 4 is heated by warm water circulated through its jacket. The water needs to be at a temperature that exceeds the boiling point of the solvent. In typical applications, hot tap water (e.g., about 50 degrees C.) can be used. The headspace of the warm column is connected to the headspace of the cold column by a hose 4a which is regulated with a needle valve 3a. The pressurized warm vapor inside the heated column 4 will flow into the headspace of the cold column 3 when the valve is opened, pushing the cold liquid down and out the bottom, or up a dip-tube 3b into the top of the material column 1.

Note that the warm vapor will simultaneously condense inside the cold solvent column 3, which will cause the liquid inside the warm column 4 to boil and continually cool. For this reason the jacket of column 4 must continue to circulate warm water to maintain temperature and pressure. Eventually all of the warm solvent will condense inside the cold column and pass through the dip-tube into the material column 1. If the initial amount of solvent that is desired is split roughly equally between the warm column 4 and cold column 3, then the entire volume of both columns will eventually pass through the material column.

Once the cold solvent column 3 is empty, it can be repurposed as a recovery column, to condense the solvent vapor as it is distilled off of the final extract solution in the collection vessel 6. This is accomplished by connecting the headspace of the collection pot to the headspace of the cooled solvent column 3, and running the CO2 refrigeration process described above. The evaporation of the CO2 in the jacket of the column now drives condensation of the solvent vapor inside the vessel itself, condensing it back into a liquid and lowering the temperature and pressure inside the vessel to continually draw more solvent vapor in. The final result will be that all of the solvent boils off from the collection vessel 6, leaving only the pure phytochemical extract behind, while condensing back into the solvent column 3, and draining out the bottom into a storage tank 5.

Figure 3E:
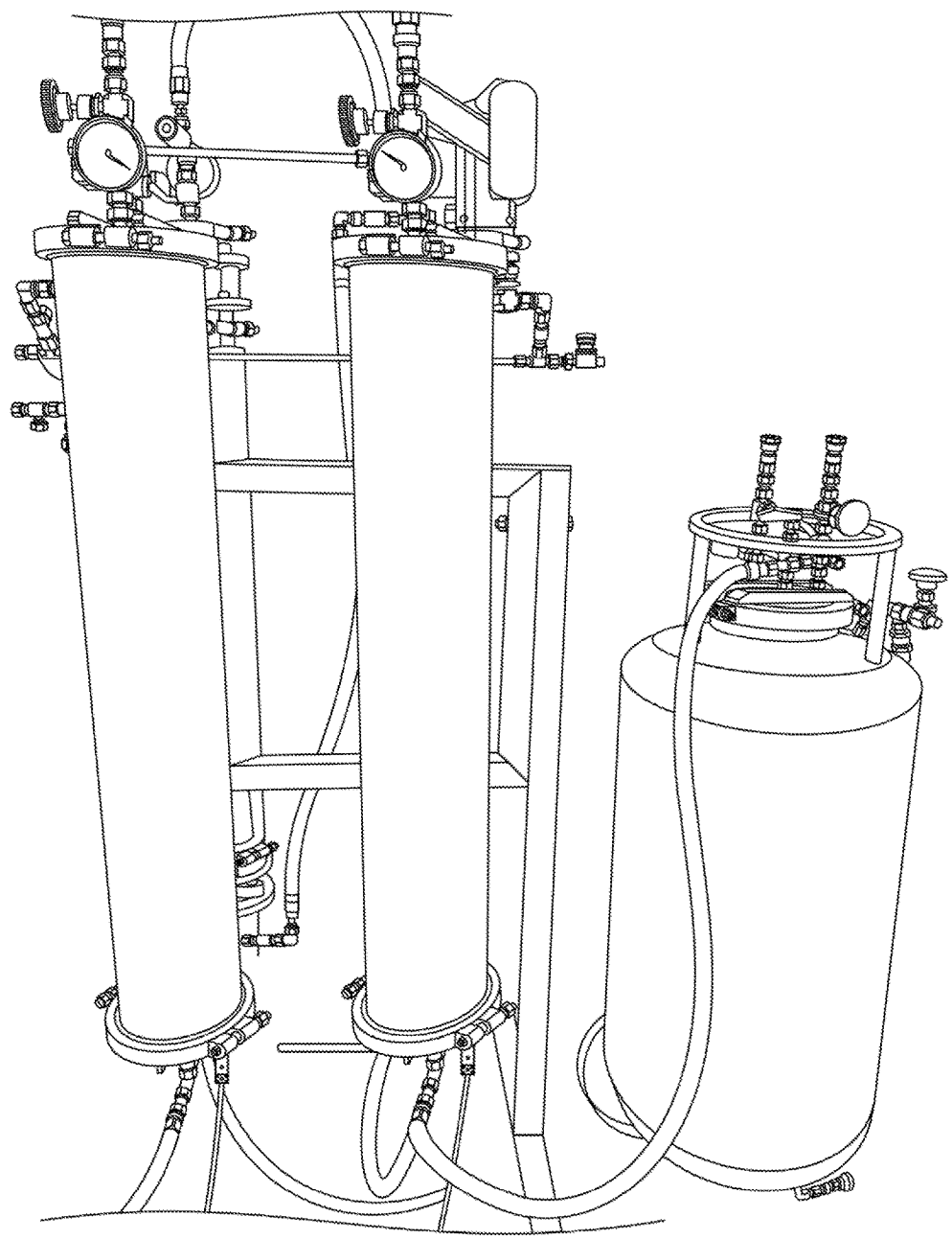
Figure 3F:
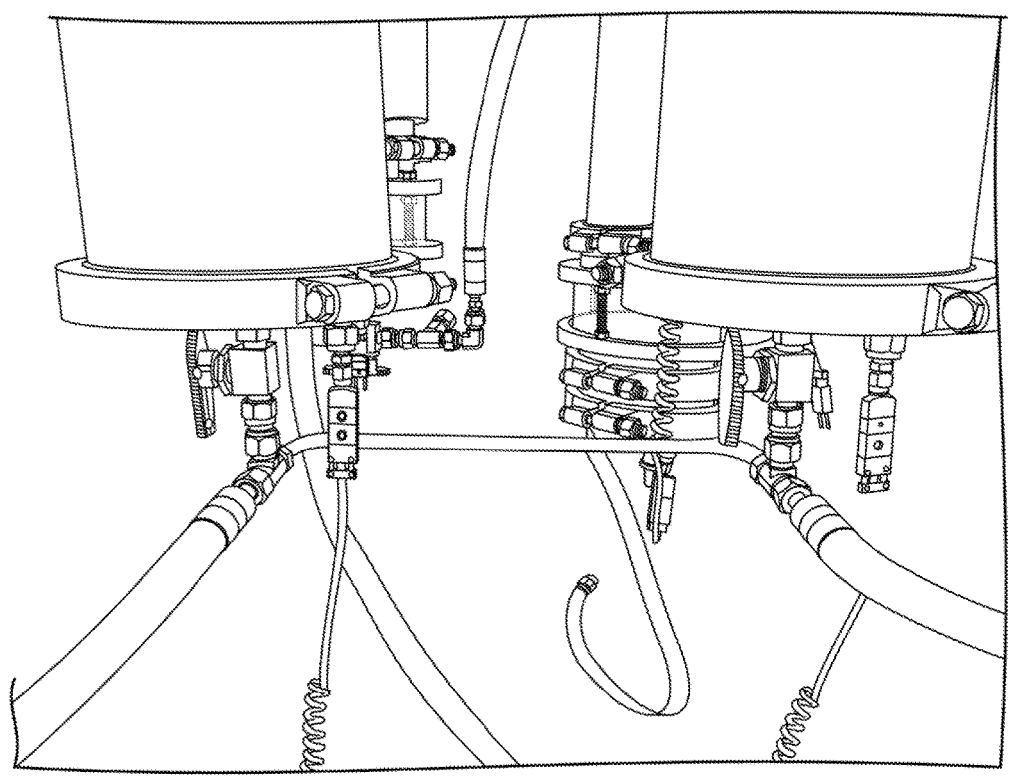
Figure 3G:
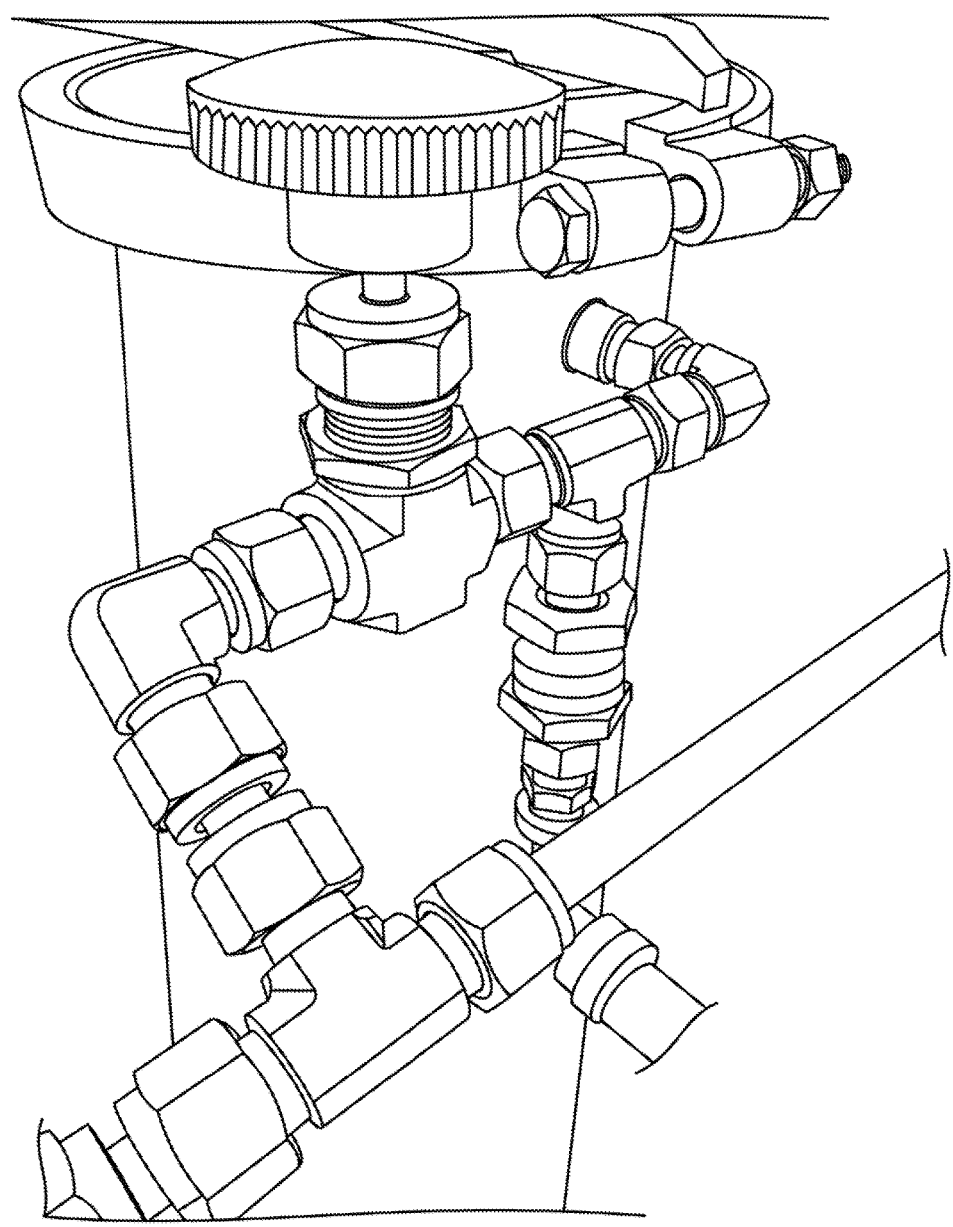

FIGS. 3E and 3F show views of two solvent columns. In FIG. 3E, a storage tank 5 is visible at right. As shown in FIGS. 1 and 3F, the bottom of the warm and cold columns can be plumbed with a manifold 5b which connect them both to this tank as a reservoir. As the cold solvent condenses in the column 3, it drains to the tank, thus keeping the entire cold column surface clear for condensation. In this mode, the refrigerated solvent column is acting as a heat-exchanger and condenser, much like a cooled coil does in an alcohol still.

Pressure-Assist Manifold

The phytochemical extraction system 100 includes a "pressure-assist manifold," which is a device for switching from a liquid to a vapor feed from the outlet of a storage tank, while simultaneously pressurizing the tank's headspace from an external pressure source. This is necessary to make the fluid in the tank flow out, without the use of a pump, when the fluid in the tank has insufficient vapor pressure itself against external back pressure. This is the case with these common solvents used in phytochemical extraction: (1) butane, isobutane, and/or propane, at low temperatures, in any combination; (2) ethanol; or (3) any other high boiling point solvent (pentane, hexane, etc.).

Figure 5:
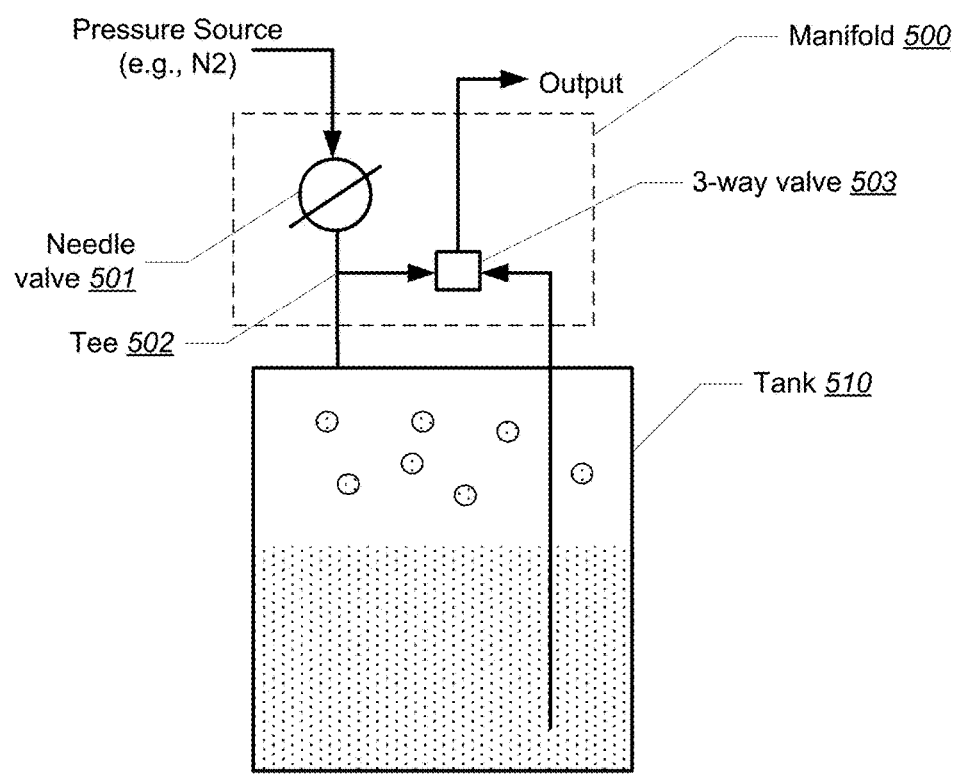
FIG. 5 shows a logical block diagram of a pressure assist manifold.

FIG. 5 shows a logical block diagram of a pressure assist manifold 500. The manifold 500 includes a needle valve 501 having two ports, a tee 502 having three ports, and a three-way valve 503 having three ports. The first port of the needle valve 501 is connected to a pressure source and a second port is connected to the first port of the tee 502. The second port of the tee 502 is connected to a vapor port of a tank 510. The tank 510 may be, for example, one of the solvent columns or the material column shown in FIG. 1. The third port of the tee 502 is connected to the first port of the three-way valve 503. The second port of the three-way valve 503 is connected to a liquid port of the tank 510. The third port of the three-way valve 503 provides the output of the manifold. The output of the manifold is typically connected to the input of the next column in the system 100 of FIG. 1.

The manifold 500 provides the following features. "Throttle" pressure may be controlled by the single needle value 501 or regulator, for both the liquid and vapor feed, simultaneously. The needle valve operates in the (0,1) interval and is connected to N2 pressure source or to warm vapor pressure assist (another tank of butane at higher temperature).

Liquid feed, vapor feed, or OFF is selected by the single 3-way valve 503, allowing the user to switch back and forth without disconnecting any hoses. While this is possible with some conventional systems, it is necessary in those applications for the operator to move connections from the liquid to vapor ports manually.

Vapor feed is used to force the low-pressure solvent out of the material column, dewaxing column, or any other stage that comes after the manifold. Regulated nitrogen or warm primary solvent vapor (or any other propellant) can be used as an external pressure source.

Figure 6A:
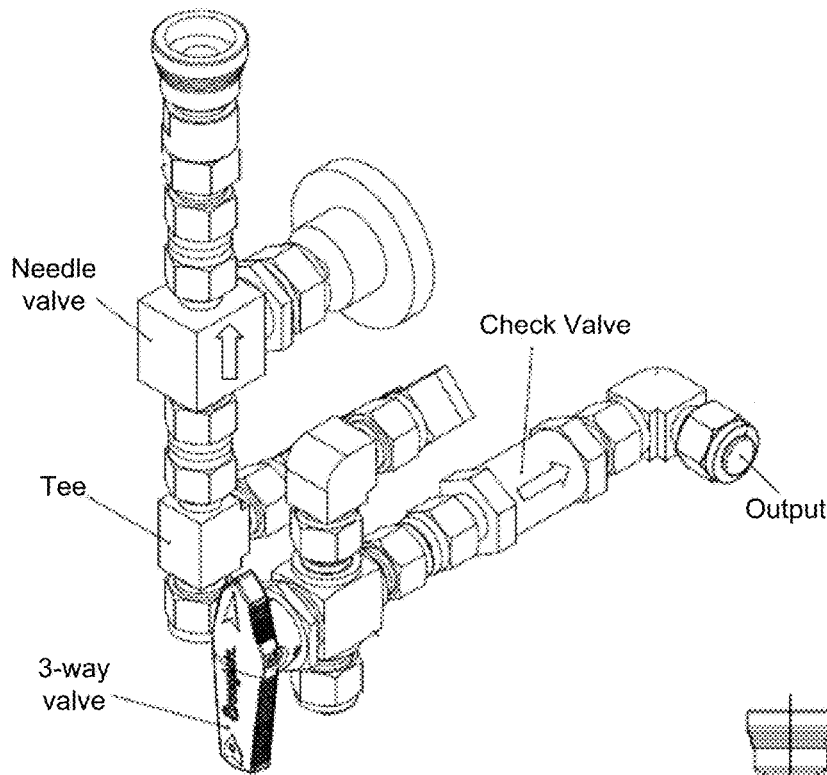
FIGS. 6A and 6B provide views of an example implementation of a pressure assist manifold according to one embodiment.
Figure 6B:
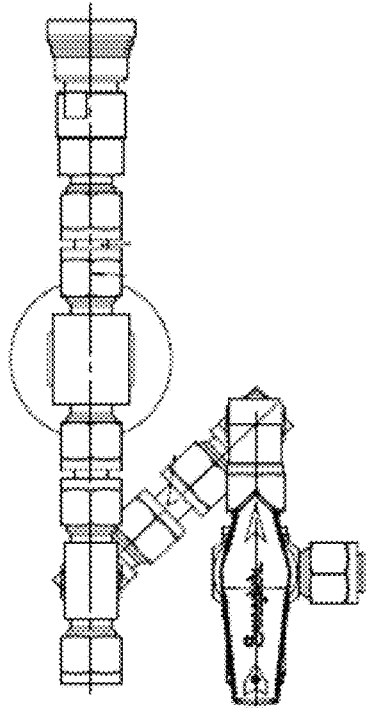

FIGS. 6A and 6B provide views of an example implementation of a pressure assist manifold according to one embodiment.

Figure 7A:
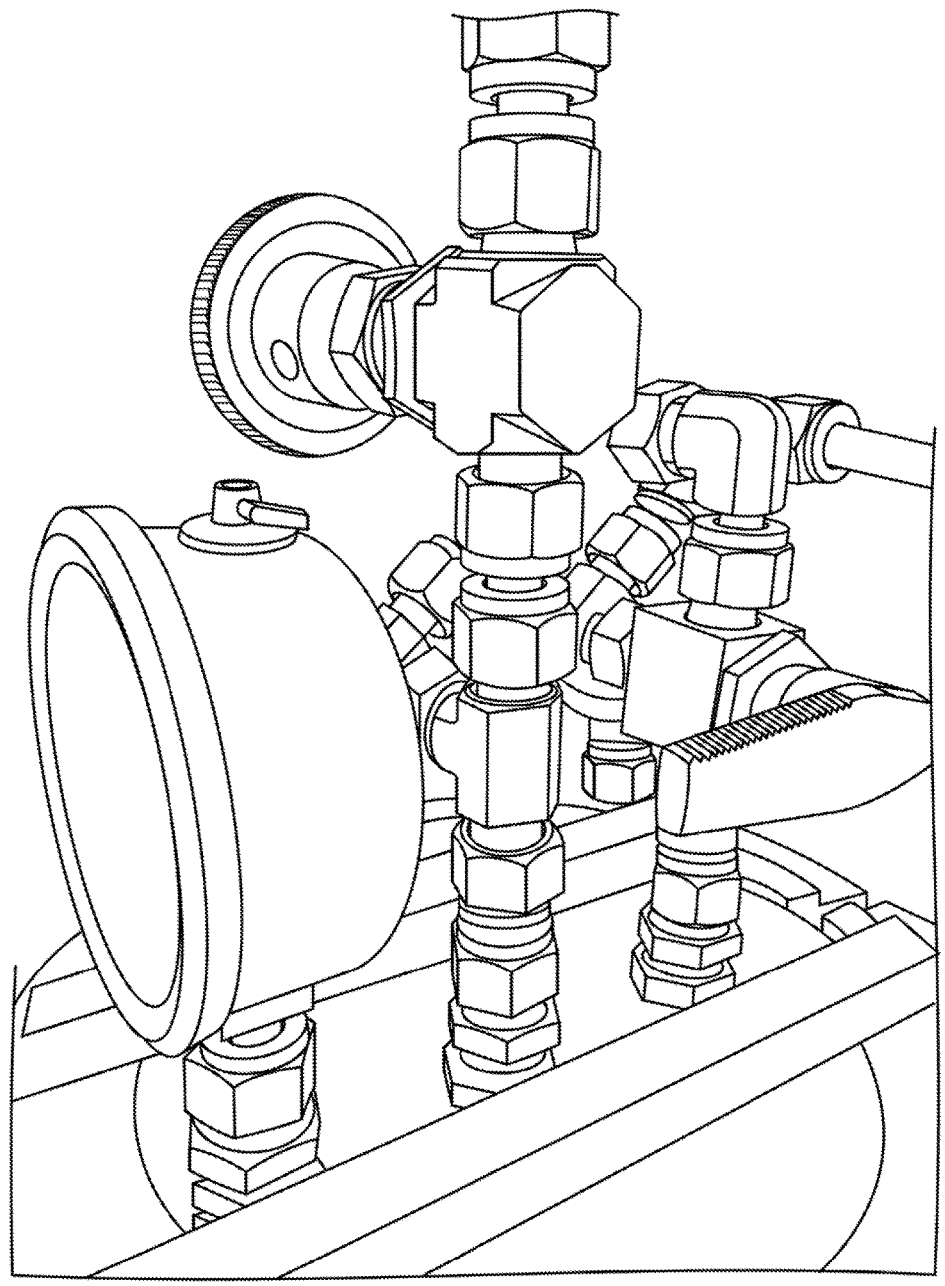
FIGS. 7A and 7B provide views of an example implementation of a pressure assist manifold according to one embodiment.
Figure 7B:
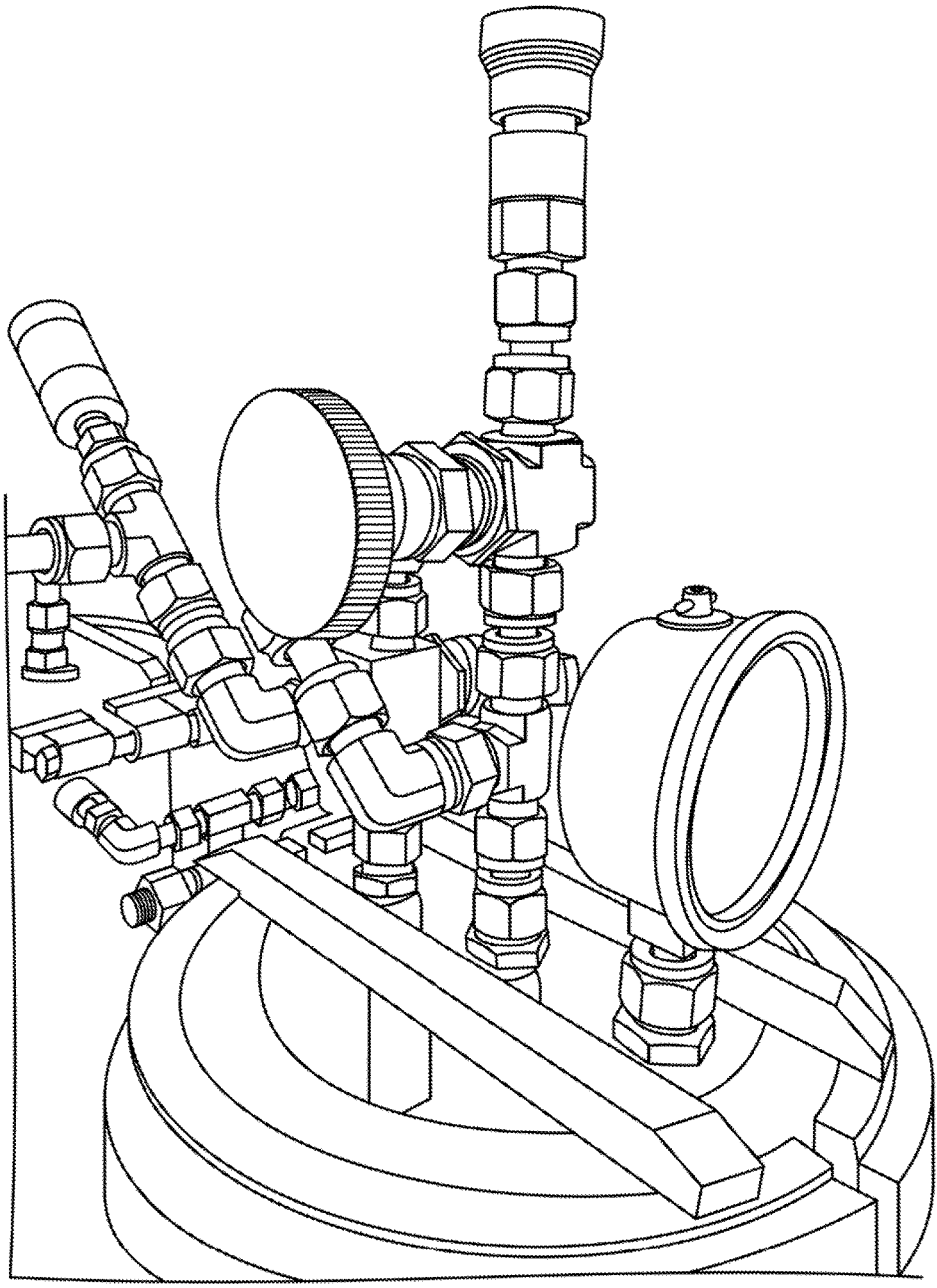
Figure 8:
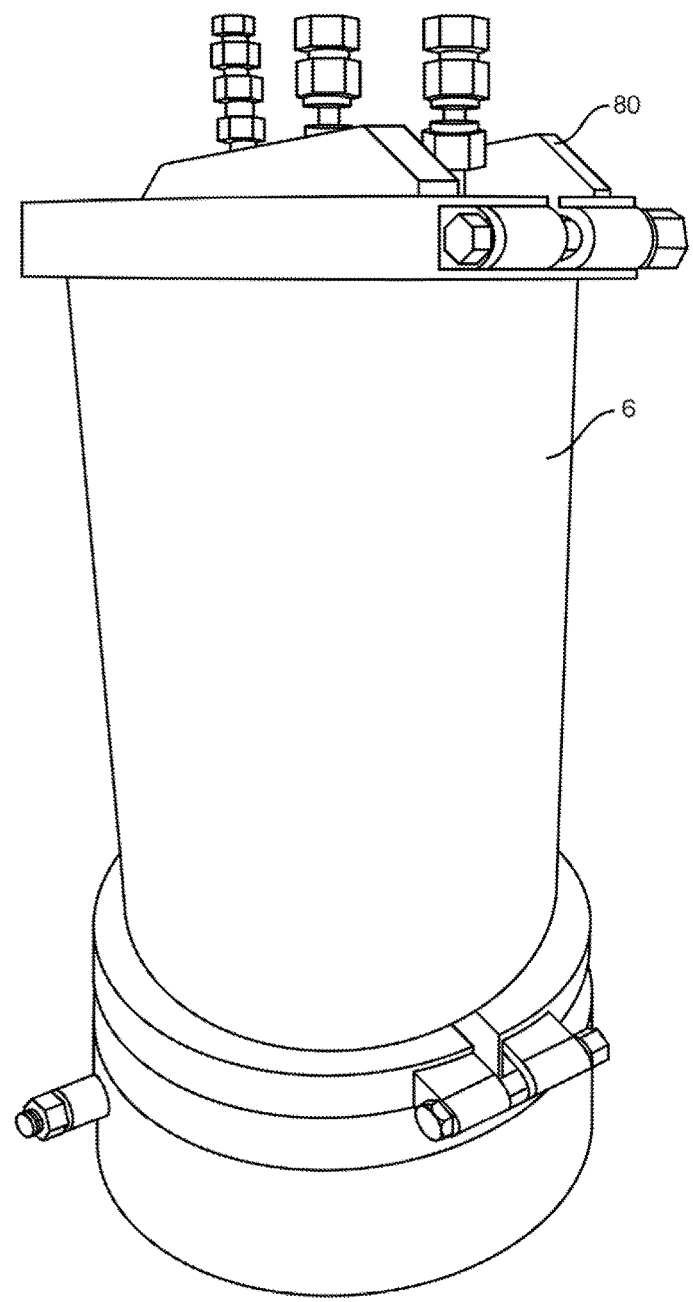
FIG. 8 shows a collection vessel.
Figure 9A:
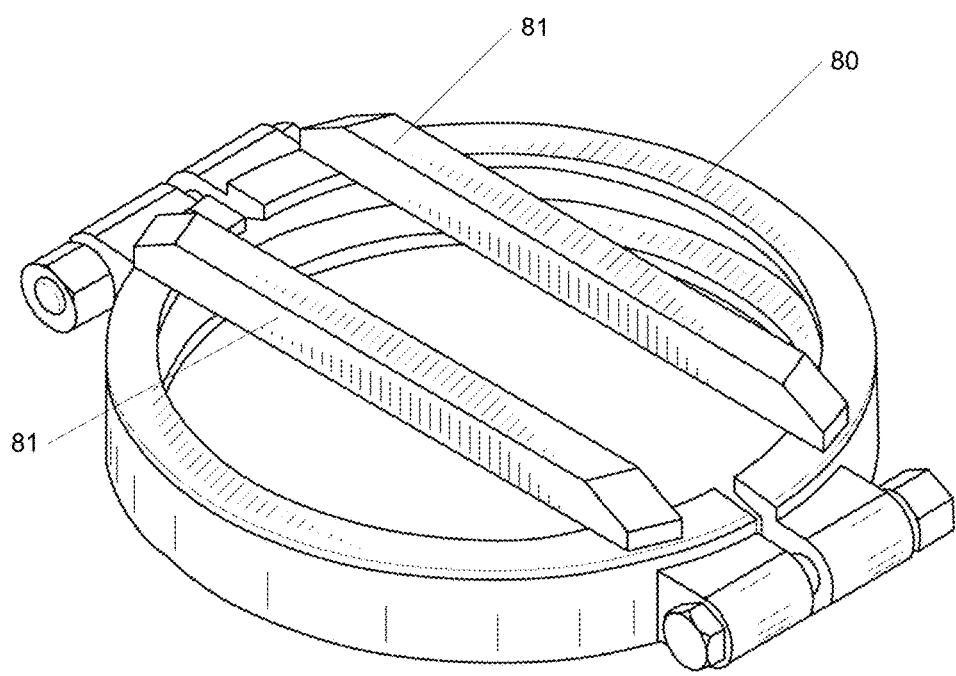
FIGS. 9A-9D are views of a retainer clamp.
Figure 9B:
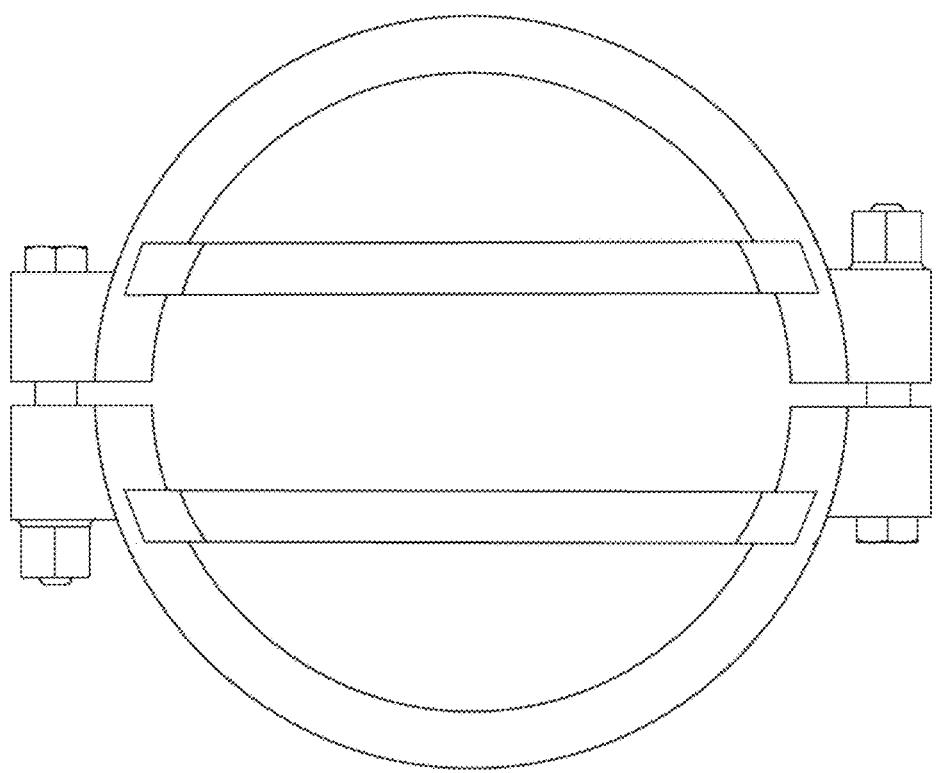
Figure 9C:
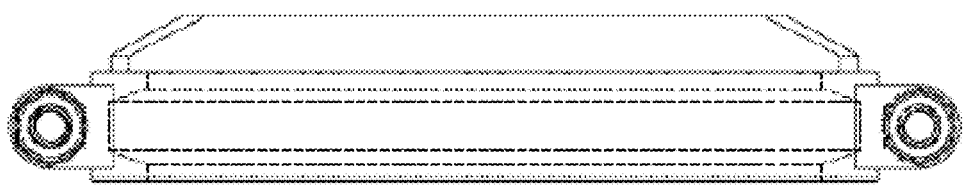
Figure 9D:

FIG. 8 shows a collection vessel 6. The collection vessel 6 is used to collect extract from an extraction column. As shown in another view in FIG. 7B, the collection vessel 6 is fitted with a clear lid that allows the operator to view the contents of the vessel.

In this embodiment, the clear lid is made from ½" thick polycarbonate. At 6 or more inches of width, the material has a low bending moment and will begin to dome noticeably at 50 psi, and will pop off around 150 psi.

FIGS. 9A-9D show a cross-barred retainer clamp 80, which is a clamp having one or more integral cross bars 81. The clamp 80 is also visible in FIGS. 7B and 8. The cross bars are constructed from ½"×¾" flat bar on 8" clamps, and ½"×½" on 6" clamps.

The cross-barred retainer clamp along with the clear lid forms a working mechanical system. In particular, the steel cross bar 81 prevents the polycarbonate cap from doming, keeping the cap flat, which keeps the circumference from shrinking and slipping out from under the S-line style tri-clamp. As the pressure increases inside of the collection vessel 6 and the cross bars 81 begin to flex, the cross bars 81 draw their welded ends closer together, thus tightening the clamp onto the cap and ferrule. The cross bar 81 must be precisely welded to the clamp in order for this to work. Some embodiments provide 0.000-0.005" of clearance between the bottom of the bars 81 and the top of the clear lid, so that the bars 81 do not scratch the clear surface during installation, and so that there is no slack before the lid engages the bars 81 for support.

While embodiments of the invention have been illustrated and described, as noted above, many changes can be made without departing from the spirit and scope of the invention. Accordingly, the scope of the invention is not limited by the above disclosure.

The invention claimed is:

1. A phytochemical extraction system, comprising:
a first solvent column that includes a jacket that surrounds an inner vessel that contains a solvent in a liquid state, wherein the jacket is filled with heated liquid which causes the solvent to boil;
a second solvent column that includes a jacket that surrounds an inner vessel that contains a solvent in a liquid state, wherein the jacket is filled with cold liquid, wherein the second solvent column vessel includes an input port that is connected to an output port of the first solvent column such that gaseous solvent flows from the first solvent column vessel into the second solvent column vessel due to pressure created by the boiling solvent in the first solvent column, wherein the second solvent column vessel includes an output port connected to a dip tube;
a material column that includes a jacket that surrounds an inner vessel that contains plant material, wherein the material column vessel includes an input port that is connected to the output port of the second solvent column vessel such that liquid solvent flows via the dip tube of the solvent column into the material column and washes the plant material, wherein the material column vessel includes an output port;
a dewaxing column that includes a jacket that surrounds an inner vessel that contains column packing, wherein the dewaxing column includes a top sight glass, a bottom sight glass, an input port, an output port, and a filter stack, wherein the input port is connected to the output port of the material column such that a mixture of solvent and compounds stripped from the plant material flows into the inner vessel of the dewaxing column, where waxes and/or lipids in the solvent mixture are separated from the mixture, wherein the waxes and/or lipids are filtered from the mixture by the filter stack before passing into the output port, wherein the output port is connected to a collection tank; and
a pressure assist manifold coupled to the material column, wherein the pressure assist manifold includes a needle valve having two ports, a tee having three ports, and a three-way valve having three ports,
wherein a first port of the needle valve is connected to a pressure source and a second port of the needle valve is connected to a first port of the tee;
wherein a second port of the tee is connected to a vapor port of the material column or the second solvent column;
wherein a third port of the tee is connected to a first port of the three-way valve;
wherein a second port of the three-way valve is connected to a liquid port of the material column or the second solvent column; and
wherein a third port of the three-way valve provides an output of the manifold.

2. The system of claim 1, wherein an open-loop CO2 refrigeration process is used to cool the jackets of one or more of the columns, wherein liquid CO2 is introduced into a top or bottom port of the jacket, thereby cooling the surface of the inner vessel.

3. The system of claim 1, wherein the cold liquid is liquid CO2.

4. The system of claim 1, wherein the top sight glass and bottom sight glass are configured to facilitate viewing of contents of the dewaxing column, wherein the top sight glass provides a view of the solvent mixture as it flows from the material column into the dewaxing column, wherein the bottom sight glass provides a view of dewaxed precipitates collecting at the bottom of the dewaxing column.

5. The system of claim 1, further comprising the collection tank, wherein the collection tank is connected to a recovery storage tank, such that solvent in the solvent mixture can be boiled off and collected in the recovery storage tank.

6. The system of claim 1, wherein the filter stack includes a section of steel tubing having a clamp ferrule at each end that is machined to accept a rigid disc-shaped metal filter.

7. The system of claim 1, wherein the liquid port is the output port of the material column, and wherein the output port of the material column is connected to a dip tube.

8. The system of claim 1, wherein the heated liquid is water at a temperature of at least 50 degrees C.

9. The system of claim 1, wherein no mechanical pumps or compressors are used in the operation of the system.

10. The system of claim 1, further comprising:
the collection tank;
a clear lid; and
a retainer clamp that removably couples the clear lid to the collection tank, wherein the retainer clamp comprises two semi-circular clamp portions, each of which includes a linear crossbar having endpoints connected to the clamp portion.

11. The system of claim 10, wherein, for each clamp portion, the crossbar is positioned to provide a gap between the crossbar and the clear lid.

12. The system of claim 11, wherein the gap is less than 0.005 inches.

13. A phytochemical extraction system, comprising:
a first solvent column that includes a jacket that surrounds an inner vessel that contains a solvent in a liquid state, wherein the jacket is filled with cold liquid, wherein the second solvent column vessel includes an output port connected to a dip tube;
a material column that includes a jacket that surrounds an inner vessel that contains plant material, wherein the material column vessel includes an input port that is connected to the output port of the second solvent column vessel such that liquid solvent flows via the dip tube of the solvent column into the material column and washes the plant material, wherein the material column vessel includes an output port; and
a pressure assist manifold coupled to the material column, wherein the pressure assist manifold includes a needle valve having two ports, a tee having three ports, and a three-way valve having three ports,
wherein a first port of the needle valve is connected to a pressure source and a second port of the needle valve is connected to a first port of the tee;
wherein a second port of the tee is connected to a vapor port of the material column or the first solvent column;
wherein a third port of the tee is connected to a first port of the three-way valve;

wherein a second port of the three-way valve is connected to a liquid port of the material column or the first solvent column; and wherein a third port of the three-way valve provides an output of the manifold.

14. The system of claim 13, further comprising:

a second solvent column that includes a jacket that surrounds an inner vessel that contains a solvent in a liquid state, wherein the jacket is filled with heated liquid which causes the solvent to boil, wherein the first solvent column vessel includes an input port that is connected to an output port of the second solvent column such that gaseous solvent flows from the second solvent column vessel into the first solvent column vessel due to pressure created by the boiling solvent in the second solvent column.

15. The system of claim 13, further comprising:

a dewaxing column that includes a jacket that surrounds an inner vessel that contains column packing, wherein the dewaxing column includes a top sight glass, a bottom sight glass, an input port, an output port, and a filter stack, wherein the input port is connected to the output port of the material column such that a mixture of solvent and compounds stripped from the plant material flows into the inner vessel of the dewaxing column, where waxes and/or lipids in the solvent mixture are separated from the mixture, wherein the waxes and/or lipids are filtered from the mixture by the filter stack before passing into the output port, wherein the output port is connected to a collection tank.

16. The system of claim 15, wherein the filter stack includes a section of steel tubing having a clamp ferrule at each end that is machined to accept a rigid disc-shaped metal filter.

17. The system of claim 13, wherein an open-loop $CO_2$ refrigeration process is used to cool the jackets of one or more of the columns, wherein liquid $CO_2$ is introduced into a top or bottom port of the jacket, thereby cooling the surface of the inner vessel.

18. A phytochemical extraction system, comprising:

a first solvent column that includes a jacket that surrounds an inner vessel that contains a solvent in a liquid state, wherein the jacket is filled with cold liquid, wherein the second solvent column vessel includes an output port connected to a dip tube;

a material column that includes a jacket that surrounds an inner vessel that contains plant material, wherein the material column vessel includes an input port that is connected to the output port of the second solvent column vessel such that liquid solvent flows via the dip tube of the solvent column into the material column and washes the plant material, wherein the material column vessel includes an output port; and a dewaxing column that includes a jacket that surrounds an inner vessel that contains column packing, wherein the dewaxing column includes an input port, an output port, and a filter stack, wherein the input port is connected to the output port of the material column such that a mixture of solvent and compounds stripped from the plant material flows into the inner vessel of the dewaxing column, where waxes and/or lipids in the solvent mixture are separated from the mixture, wherein the waxes and/or lipids are filtered from the mixture by the filter stack before passing into the output port, wherein the output port is connected to a collection tank, wherein the filter stack includes a section of steel tubing having a clamp ferrule at each end that is machined to accept a rigid disc-shaped metal filter.

19. The system of claim 18, further comprising the collection tank;

a clear lid; and a retainer clamp that removably couples the clear lid to the collection tank, wherein the retainer clamp comprises two semi-circular clamp portions, each of which includes a linear crossbar having endpoints connected to the clamp portion.

20. The system of claim 18, wherein an open-loop $CO_2$ refrigeration process is used to cool the jackets of one or more of the columns, wherein liquid $CO_2$ is introduced into a top or bottom port of the jacket, thereby cooling the surface of the inner vessel.

* * * * *

UNITED STATES PATENT AND TRADEMARK OFFICE
CERTIFICATE OF CORRECTION

PATENT NO. : 10,315,130 B2
APPLICATION NO. : 15/339816
DATED : June 11, 2019
INVENTOR(S) : Boris David Kogon Page 1 of 1

It is certified that error appears in the above-identified patent and that said Letters Patent is hereby corrected as shown below:

In the Claims

Column 10, Line 47 Claim 13, "second" should be --first--.

Column 10, Line 52 Claim 13, "second" should be --first--.

Column 12, Line 2 Claim 18, "second" should be --first--.

Column 12, Line 7 Claim 18, "second" should be --first--.

Signed and Sealed this
Ninth Day of June, 2020

Andrei Iancu
*Director of the United States Patent and Trademark Office*